US009740437B2

(12) United States Patent
Mielke et al.

(10) Patent No.: US 9,740,437 B2
(45) Date of Patent: Aug. 22, 2017

(54) MECHANISM TO ADAPT GARBAGE COLLECTION RESOURCE ALLOCATION IN A SOLID STATE DRIVE

(71) Applicant: Intel Corporation, Santa Clara, CA (US)

(72) Inventors: Neal R. Mielke, Los Altos Hills, CA (US); Mark Anthony Golez, Folsom, CA (US); David J. Pelster, Longmont, CO (US); Paul D. Ruby, Folsom, CA (US); Xin Guo, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 101 days.

(21) Appl. No.: 14/672,084

(22) Filed: Mar. 27, 2015

(65) Prior Publication Data

US 2016/0283161 A1    Sep. 29, 2016

(51) Int. Cl.
*G06F 12/00* (2006.01)
*G06F 3/06* (2006.01)
*G06F 12/02* (2006.01)

(52) U.S. Cl.
CPC .......... *G06F 3/0679* (2013.01); *G06F 3/0616* (2013.01); *G06F 3/0652* (2013.01); *G06F 12/0246* (2013.01)

(58) Field of Classification Search
CPC ... G06F 3/0679; G06F 3/0652; G06F 12/0246
USPC ........................................................ 711/170
See application file for complete search history.

(56) References Cited

U.S. PATENT DOCUMENTS

| 2012/0036309 | A1  | 2/2012 | Dilow et al. |
| 2014/0032817 | A1* | 1/2014 | Bux ..................... G06F 12/0246 711/103 |
| 2014/0059279 | A1  | 2/2014 | He et al. |
| 2015/0019797 | A1  | 1/2015 | Huang et al. |

FOREIGN PATENT DOCUMENTS

WO    2011-071645 A1    6/2011

OTHER PUBLICATIONS

International Search Report and Written Opinion received for International Application No. PCT/US2016/018516, mailed on Jun. 3, 2016, 12 pages.
"Intel Solid-State Drives in Server Storage Applications", White Paper, Feb. 2014, Intel Corporation, 24 pages.

* cited by examiner

*Primary Examiner* — Jae Yu
(74) *Attorney, Agent, or Firm* — Alpine Technology Law Group LLC

(57) ABSTRACT

Methods and apparatus related to a mechanism for quickly adapting garbage collection resource allocation for an incoming I/O (Input/Output) workload are described. In one embodiment, non-volatile memory stores data corresponding to a first workload and a second workload. Allocation of one or more resources in the non-volatile memory is determined based at least in part on a determination of an average validity of one or more blocks, where the one or more candidate bands are to be processed during operation of the first workload or the second workload. Other embodiments are also disclosed and claimed.

26 Claims, 10 Drawing Sheets

MECHANISM TO ADAPT GARBAGE COLLECTION RESOURCE ALLOCATION IN A SOLID STATE DRIVE

FIELD

The present disclosure generally relates to the field of electronics. More particularly, some embodiments generally relate to a mechanism for managing memory allocation in a Solid State Drive (SSD).

BACKGROUND

Generally, memory used to store data in a computing system can be volatile (to store volatile information) or non-volatile (to store persistent information). Volatile data structures stored in volatile memory are generally used for temporary or intermediate information that is required to support the functionality of a program during the run-time of the program. On the other hand, persistent data structures stored in non-volatile (or persistent memory) are available beyond the run-time of a program and can be reused. Moreover, new data is typically generated as volatile data first, before a user or programmer decides to make the data persistent. For example, programmers or users may cause mapping (i.e., instantiating) of volatile structures in volatile main memory that is directly accessible by a processor. Persistent data structures, on the other hand, are instantiated on non-volatile storage devices like rotating disks attached to Input/Output (I/O or IO) buses or non-volatile memory based devices like flash memory or Solid State Drives.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
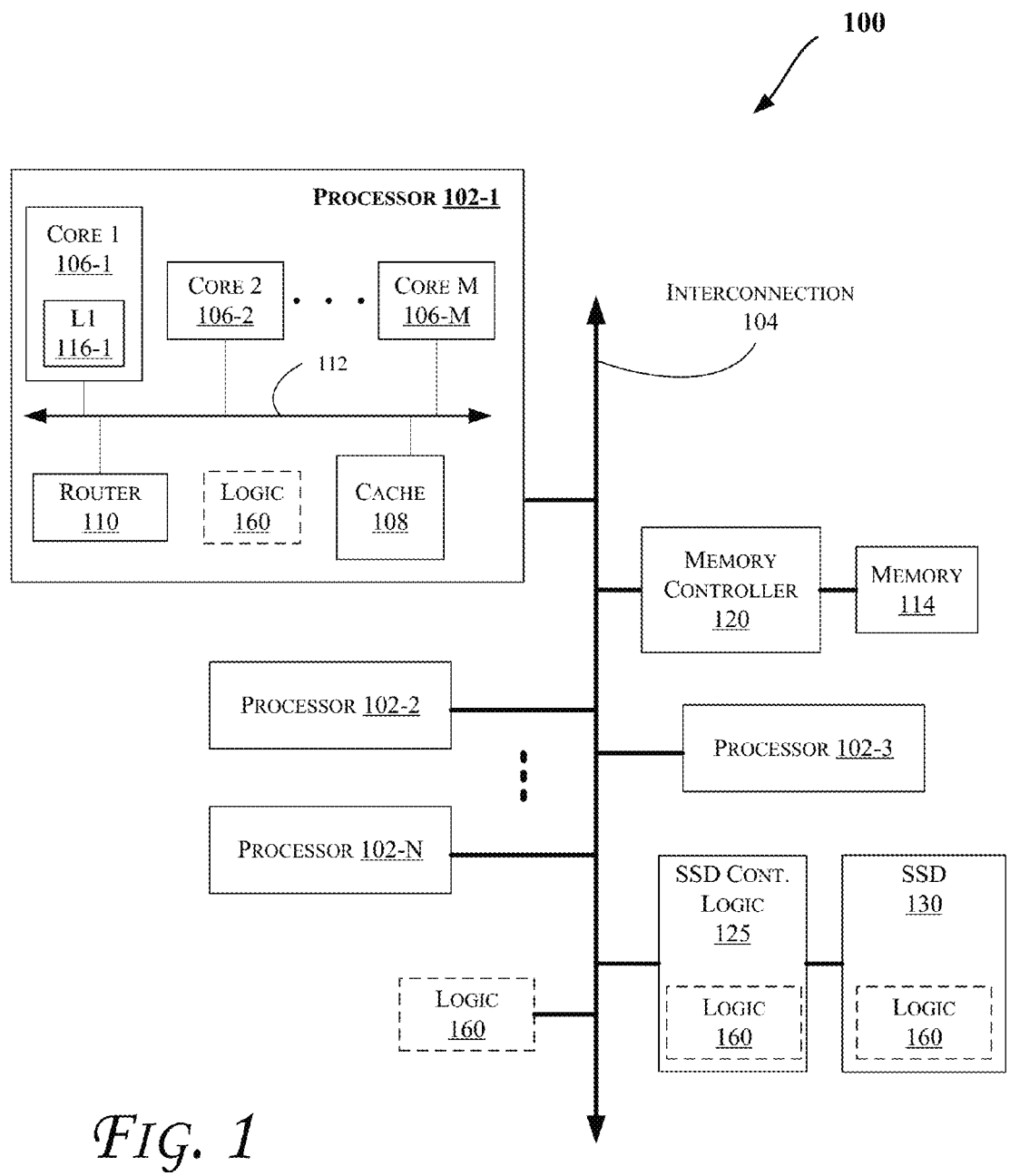
FIGS. 1 and 4-6 illustrate block diagrams of embodiments of computing systems, which may be utilized to implement various embodiments discussed herein.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Generally, random write bandwidth can be artificially high when an SSD is empty. Empty means fresh out-of-the box or immediately following a Secure Erase operation. With an SSD in the empty state, there is usually no background clean-up (garbage collection) to be performed before data can be written to it. As data is written to the drive, it will reach a level referred to as steady-state, where writes and garbage collection are appropriately balanced to measure the SSD's performance. Moreover, the way in which the drives are written to is a primary difference between HDDs (Hard Disk Drives) and SSDs. Data can be over-written to an HDD at any time by just changing the magnetic information on the platter. With an SSD, information cannot be overwritten because SSDs are made up of NAND flash memory. Generally, NAND memory is arranged into pages; the pages are arranged into blocks. Data can only be written to a page that is empty or (e.g., newly) erased. When the drive is new, all the pages are empty and therefore can be written quickly. As most or all of the pages are written to the drive becomes full, therefore a block is erased to make space for new data to be written. Erases may only occur in blocks, not individual pages. To make the erasing and moving of data possible, SSDs have extra NAND that is not calculated into the advertised capacity of the drive. This amount of extra NAND varies by drive model. The extra NAND, or spare area, is used so the drive can perform writes, even when the drive is full of data.

As Solid State Drives (SSDs) move to lower cost, higher capacity NAND technologies, band size increases along with the increase in NAND Erase Block (which is the minimum erase granularity in NAND media or "EB") size. As discussed herein, a "band" generally refers to a logical structure or block which is composed of (or otherwise includes) the same EB(s) across some number of NAND die. Newer SSDs have a smaller number of bigger bands. Generally, garbage collection's primary purpose is to free space occupied by invalid data. As discussed herein, "invalid data" generally refers to data that is obsolete and no longer considered as usable. For example, an ATA Trim command (in accordance with at least one Instruction Set Architecture) allows proactively marking NAND blocks that contain user data—but which are no longer used—as invalid. This allows the SSD to be more efficient by eliminating the need for moving obsolete data during internal garbage collection activity. Also, this approach improves write performance after large amounts of data is discarded. In addition to its primary purpose, some SSD garbage collection mechanisms may handle moving valid data during wear leveling and Background Data Refresh (BDR), while maintaining consistent SSD performance. In order to perform all these functions, some number of bands are reserved for garbage collection. These reserved bands do not count towards the drive's effective spare. As discussed herein, "effective spare" generally refers to the amount of extra physical capacity in the drive beyond the logical reported capacity. As band size increases, reserved bands required for garbage collection continue to take a larger percentage of physical space away from the SSD's effective spare, lowering performance and decreasing SSD life (or increasing Write Amplification (WA)).

Moreover, initial garbage collection design tended to trade off effective spare for implementation simplicity and allowed for extra reserved bands to satisfy specific workload performance consistency targets. However, with the increase in band sizes, the trade-off is no longer cost effective. Moreover, during steady state, free space production runs at the same rate as host consumption using some amount of resources based on the system's understanding of the workload. However, during a workload transition, garbage collection may need to adapt its resource allocation which may cause it to fall behind the host. Hence, during a workload transition, the host can consume free space faster than it is produced and if not managed correctly, other system services could starve of free space and the entire SSD could fail.

In order to prevent such a catastrophic failure during workload transitions from happening, garbage collection may use some of its bands as reserve space for the host to consume as it adapts its resources and catches up with the host. The amount of reserve space consumed depends on how quickly resources are adapted to the new workload. By allowing garbage collection to adapt its resources faster, some of the bands reserved for garbage collection can be freed up and returned as effective spare for the SSD.

To this end, some embodiments relate to a mechanism for quickly adapting garbage collection resource allocation for an incoming (e.g., I/O (Input/Output)) workload and maximize Solid State Drive (SSD) effective spare capacity. An embodiment provides the capability to dynamically maximize the SSD's effective spare by minimizing garbage collection's operational spare requirements. Through (e.g., opportunistically) increasing effective spare, SSD performance is improved, write amplification reduced, and overall drive life increased. In addition, if there is a good understanding of the expected user or customer workload, less NAND media is needed on the SSD to achieve the target spare level, reducing Bill-Of-Materials (BOM) cost.

Also, while some embodiments are discussed with reference to NAND media, embodiments are not limited to NAND media and may be applied to NOR media. Furthermore, even though some embodiments are discussed with reference to SSDs (e.g., including NAND and/or NOR type of memory cells), embodiments are not limited to SSDs and may be used for other types of non-volatile storage devices (or Non-Volatile Memory (NVM)) including, for example, one or more of: nanowire memory, Ferro-electric transistor random access memory (FeTRAM), magnetoresistive random access memory (MRAM), flash memory, Spin Torque Transfer Random Access Memory (STTRAM), Resistive Random Access Memory, byte addressable 3-Dimensional Cross Point Memory, PCM (Phase Change Memory), etc.

The techniques discussed herein may be provided in various computing systems (e.g., including a non-mobile computing device such as a desktop, workstation, server, rack system, etc. and a mobile computing device such as a smartphone, tablet, UMPC (Ultra-Mobile Personal Computer), laptop computer, Ultrabook™ computing device, smart watch, smart glasses, smart bracelet, etc.), including those discussed with reference to FIGS. 1-6. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 120, memory controllers (such as those discussed with reference to FIGS. 4-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102. As shown in FIG. 1, the memory 114 may be in communication with the processors 102 via the interconnection 104. In an embodiment, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 1, memory 114 may be coupled to other components of system 100 through a memory controller 120. Memory 114 includes volatile memory and may be interchangeably referred to as main memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

System 100 may also include Non-Volatile (NV) storage device such as an SSD 130 coupled to the interconnect 104 via SSD controller logic 125. Hence, logic 125 may control access by various components of system 100 to the SSD 130. Furthermore, even though logic 125 is shown to be directly coupled to the interconnection 104 in FIG. 1, logic 125 can alternatively communicate via a storage bus/interconnect (such as the SATA (Serial Advanced Technology Attachment) bus, Peripheral Component Interconnect (PCI) (or PCI express (PCIe) interface), etc.) with one or more other components of system 100 (for example where the storage bus is coupled to interconnect 104 via some other logic like a bus bridge, chipset (such as discussed with reference to FIGS. 4-6), etc.). Additionally, logic 125 may be incorporated into memory controller logic (such as those discussed with reference to FIGS. 1 and 4-6) or provided on a same Integrated Circuit (IC) device in various embodiments (e.g., on the same IC device as the SSD 130 or in the same enclosure as the SSD 130).

Furthermore, logic 125 and/or SSD 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein such as those discussed with reference to other figures including 4-6, for example), including the cores 106, interconnections 104 or 112, components outside of the processor 102, SSD 130, SSD bus, SATA bus, logic 125, logic 160, etc., to sense variations in various factors affecting power/thermal behavior of the system/platform, such as temperature, operating frequency, operating voltage, power consumption, and/or inter-core communication activity, etc.

As illustrated in FIG. 1, SSD 130 may include logic 160, which may be in the same enclosure as the SSD 130 and/or fully integrated on a Printed Circuit Board (PCB) of the SSD 130. Logic 160 provides a mechanism for quickly adapting garbage collection resource allocation for an incoming I/O (Input/Output) workload as discussed herein, e.g., with reference to FIGS. 2A-6.

More particularly, an embodiment (also referred to as Forward MAV (Moving Average Validity) or FMAV) allows garbage collection to adapt its resources to changing workloads much faster; therefore, reducing the number of bands it requires. This in turn translates to more effective spare, better performance, and longer SSD life. To solve this problem, garbage collection can examine the state of bands that are candidates for garbage collection instead of the state of bands that have just been processed. By examining the amount of valid data in the candidate bands, garbage collection has a better representation of the required resources for the incoming workload and can adapt its resource allocation faster.

In some implementations (such as the flow/block diagram of FIG. 2A), each time a band (e.g., from a queue of candidate bands 208) is processed by garbage collection 204, the amount of valid data in that band is noted. The moving average of the validity of the last (e.g., 32) bands processed 202 is called the rear-view moving average validity (or rear-view MAV). This is used to represent the workload as well as calculate how much resources garbage collection 204 requires. The moving average validity is a good representation of how much resources are required since the amount of valid data is directly related to how much work garbage collection needs to perform. For example, if the last 32 bands processed contained 20% valid data, then the logic/firmware assigns 20% (plus some adder for overhead) of the system's buffer for garbage collection work.

The rear-view MAV is however the historic running average of the last 32 bands. This means that an incoming workload, one that requires more resources, could be using the same amount of resources as the previous workload. There could be a relatively very long time delay between host workload change and the rear-view MAV settling to the correct value. During this time, garbage collection will be running behind the host, free space production will not match host consumption and free space will fall. Additional bands are needed to serve as reserve space for host consumption until garbage collection can catch-up. Without the additional bands as "cushion" other critical system services would starve of free space and the system would fail.

Figure 2A:
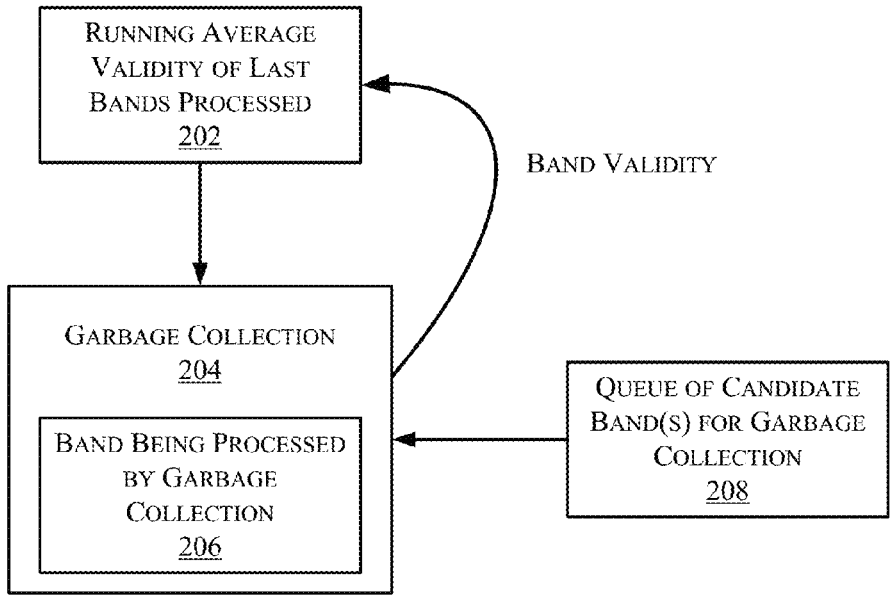
FIGS. 2A and 2C illustrate block diagrams for different methods of calculating resource allocation for garbage collection, according to some embodiments.
Figure 2C:
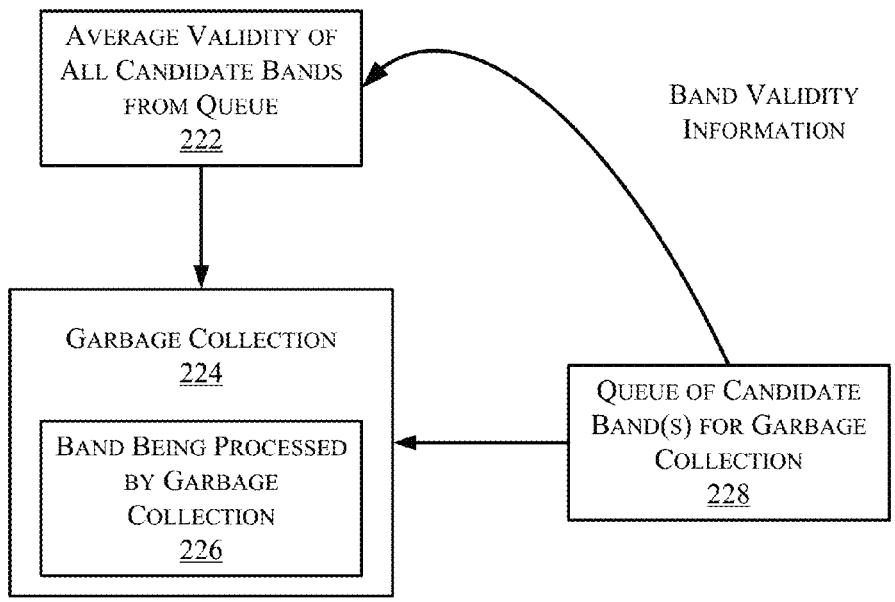
Figure 2B:
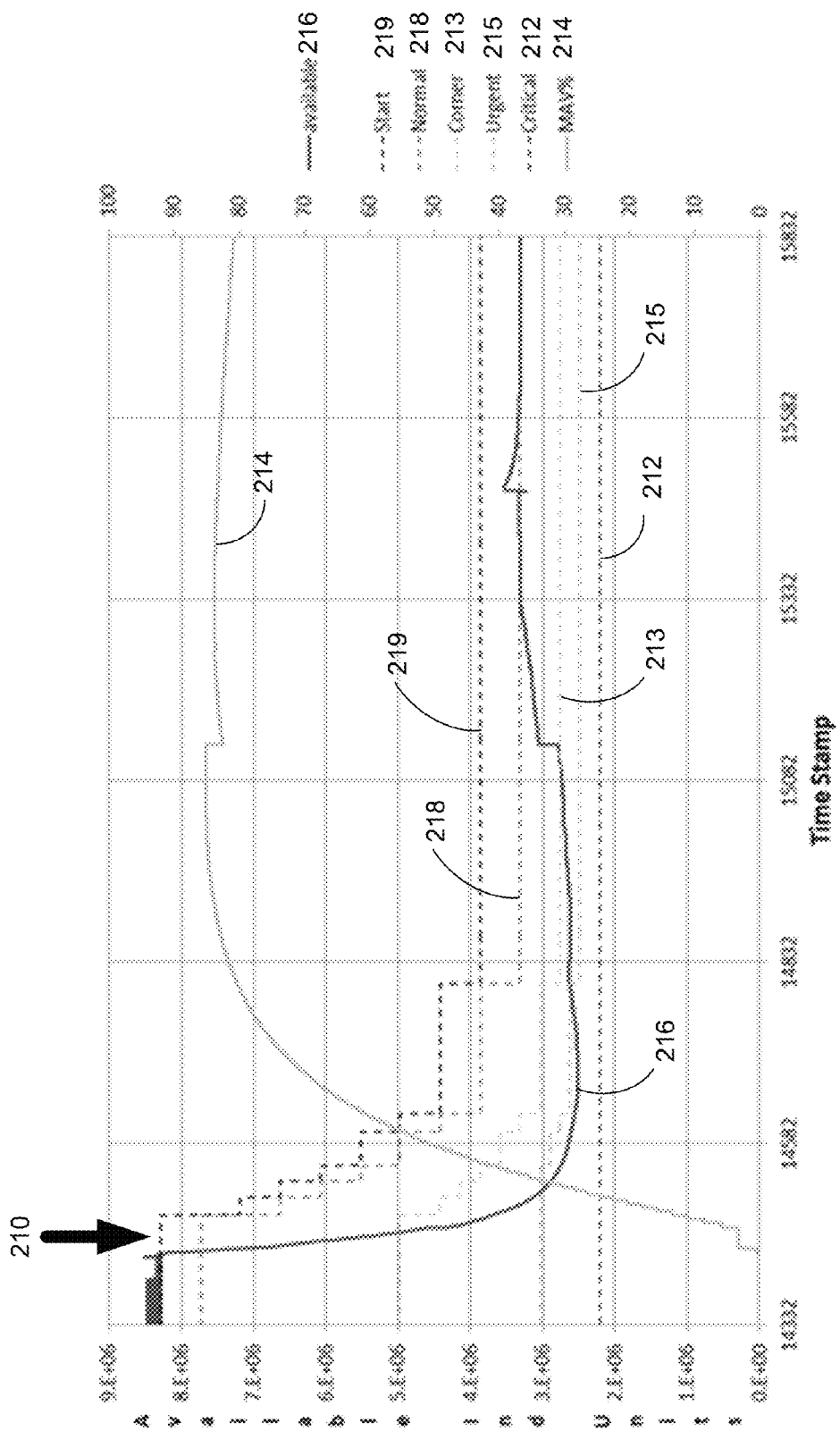
FIGS. 2B, 2D, 2E, and 2F illustrate graphs of sample curves, according to some embodiments.

FIG. 2B illustrates a graph of available free space over time (where the available free space is expressed as available indirection unit (labeled as "IND" in the figures)). More specifically, FIG. 2B highlights the effect of rear-view MAV to free space during a workload transition. The workload transition happens around the arrow 210. The workload on the left is represented by a MAV (rear-view MAV) of 0, while the one on the right will have a MAV of about 80. "Available" is the amount of free space that the system currently has. At "Normal" free space production equals host consumption. The goal is to have "Available" at or very close to "Normal" at all the times, except for workloads with MAV=0. When "Available" hits "Critical" other system services will starve of free space and the system can fail as discussed before.

In FIG. 2B, "Available" drops significantly below "Normal" but does not reach "Critical" because of the extra bands of reserve space for host consumption between "Normal" and "Critical". Note how "Available" approaches "Normal" as MAV slowly approaches its correct value. If MAV changed faster, "Available" would not have significantly dropped below "Normal" and the few bands of reserved space could be returned as effective spare for the SSD.

In order to prevent free space from dropping significantly below "Normal" Forward MAV (FMAV) can be utilized in an embodiment (see, e.g., FIG. 2C illustrating a block/flow diagram of FMAV, according to an embodiment). In an embodiment, logic 160 includes one or more of the blocks shown in FIG. 2C. Candidate bands for garbage collection processing 226 are organized in queue(s) 228. By using the validity of the bands in the queues to calculate the moving average validity 222, garbage collection 224 has a better representation of the resources needed for the incoming workload and can adapt its resource allocation faster.

Figure 2D:
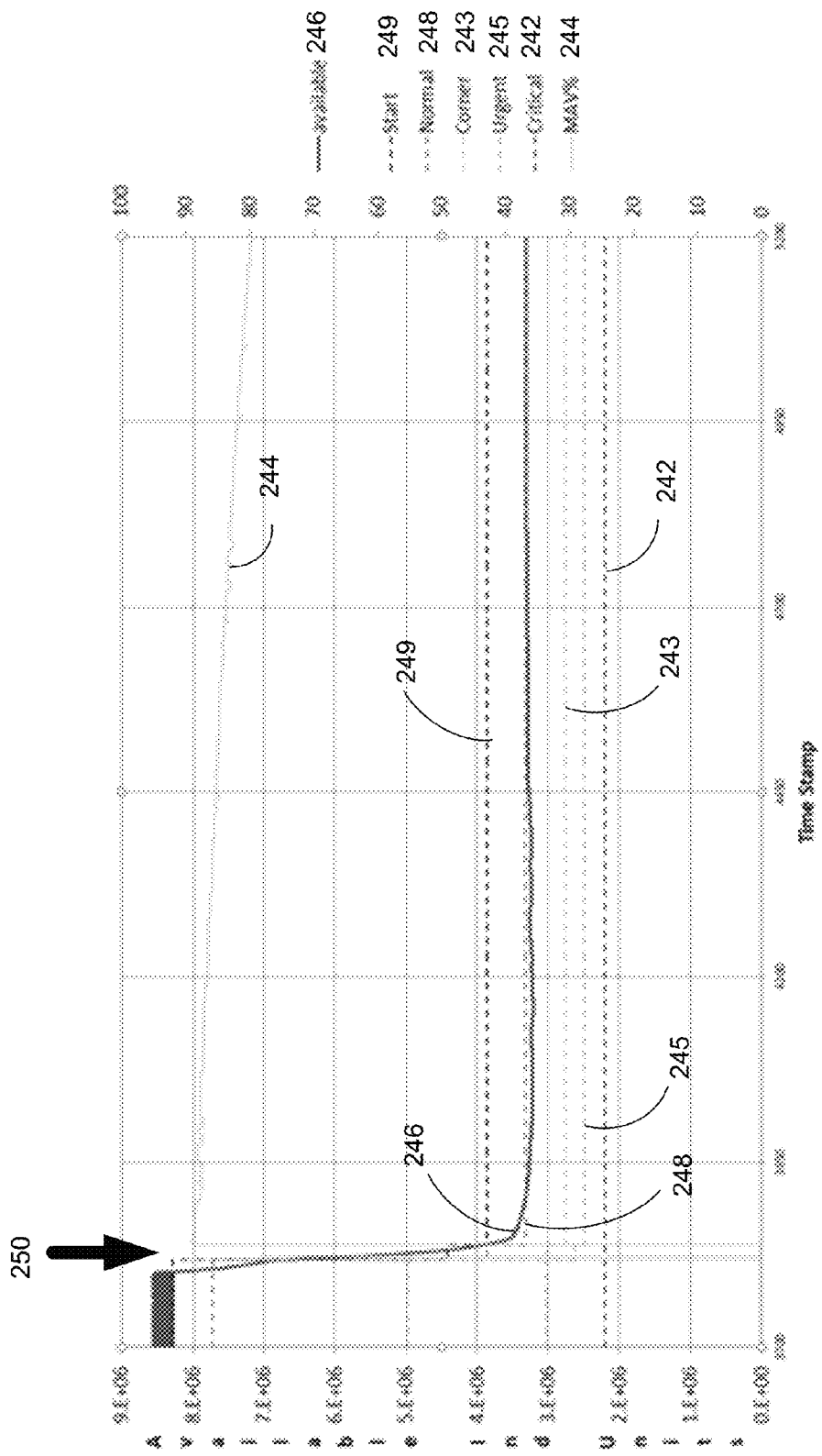

FIG. 2D illustrates a graph of available free space over time. More specifically, FIG. 2D highlights the effect of FMAV to free space during a workload transition. The workload transition happens around the arrow 250. Workload on the left is represented by a MAV (FMAV) of 0, while the workload on the right will have a MAV of about 80. Since MAV quickly responded to the change in workload, Available does not significantly drop below Normal and some number of bands of reserve space can now be returned as effective spare to the SSD. The current workload and the amount of time it takes garbage collection to adapt its resource allocation during workload transitions are two major factors that decide the number of reserved bands required by garbage collection to guarantee functionality and SSD performance consistency.

Workloads that generate a high WA need less reserved bands compared to low WA workloads. By detecting the workload running on the SSD, garbage collection can release unneeded reserved bands as effective spare while still maintaining performance consistency. In addition, by quickly adapting its resource allocation during workload transitions, garbage collection 224 can release additional reserved bands as effective spare while maintaining SSD functionality.

As previously discussed, some garbage collection implementations may reserve a fixed number of bands, based on worst case, for SSD functionality and performance consistency. In accordance with some embodiments, unneeded reserved bands are returned as effective spare based on the workload, with high WA workloads receiving the most spare, for example. The additional effective spare translate to better performance and lower WA.

To solve this problem, garbage collection logic (e.g., logic 226 of FIG. 2C) examines the moving average validity (MAV) of the bands to be processed. The number of reserved bands for garbage collection is adjusted based on the MAV. Since MAV and WA have a direct relationship, workloads with high WA and MAV are allocated less reserved bands and more effective spare while workloads with low WA/MAV receive the opposite.

Figure 2E:
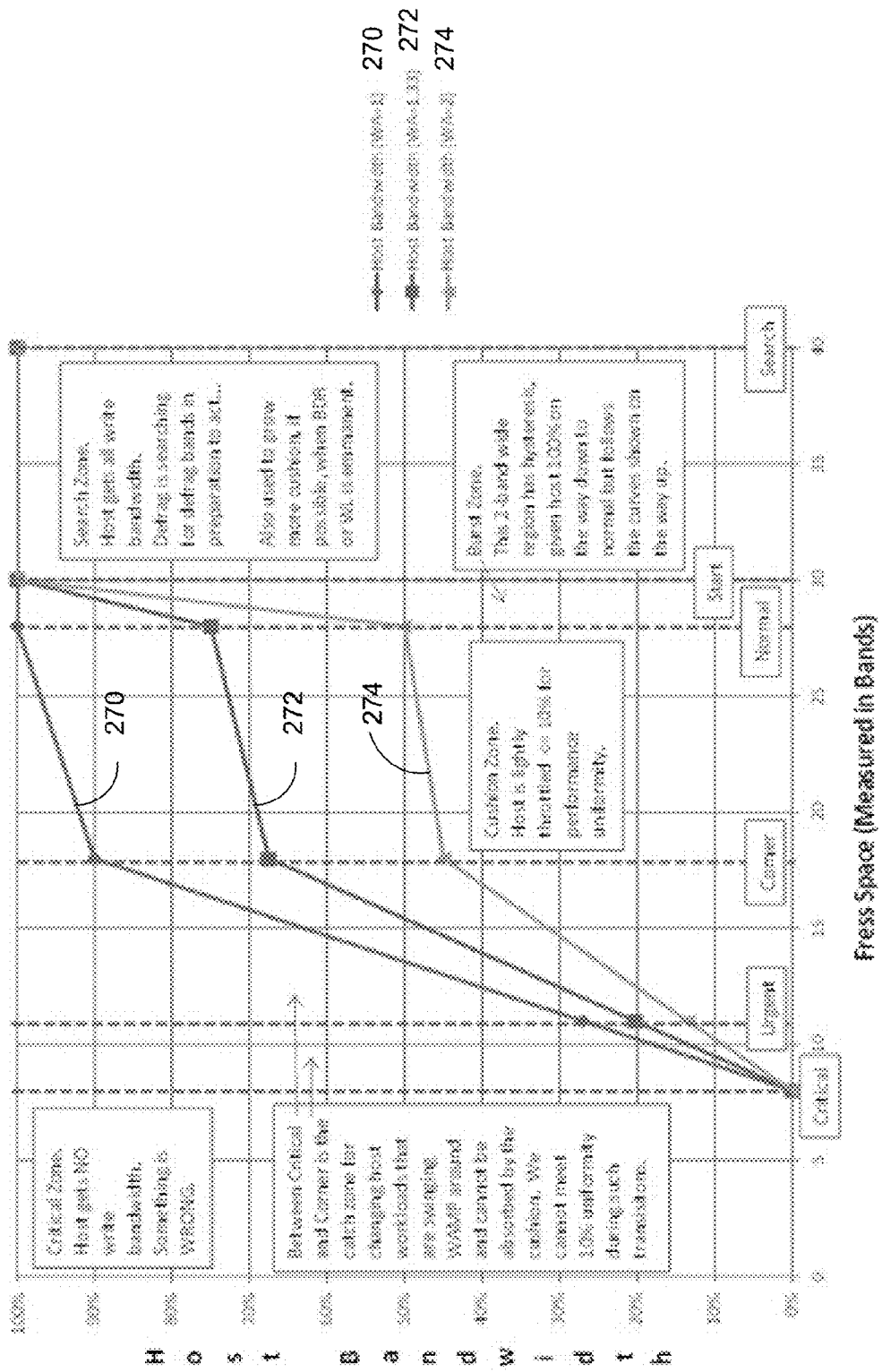

Moreover, in some implementations, during power up, the SSD statically allocates some number of reserved bands for garbage collection's use. For example, ten bands are reserved to maintain performance consistency during normal operation and an additional ten are reserved to maintain SSD functionality during workload transitions. The number of reserved bands stays fixed and do not change even if some number of them are not necessary based on the current workload. For instance, performance consistency requirements require that drive performance does not drop below 90% of the average. In order to satisfy this requirement, garbage collection uses the amount of free space in the SSD and the workload's WA as feedback to determine how much resources and bandwidth is required. Since WA and MAV have a direct relationship, the logic/firmware uses the MAV of bands to be processed as a measure of the workload's WA. FIG. 2E shows a graph for the relationship between WA, free space, and host/garbage collection bandwidth (garbage collection bandwidth is the inverse of the host bandwidth).

The reason for the ten band performance consistency cushion (Normal to Corner in FIG. 2E) is to absorb completely valid bands sent to garbage collection logic by BDR and wear leveling at regular time intervals. BDR and wear-level bands can have arbitrary validity up to 100%. If the WA of a given host workload is very low, e.g., close to 1, the host is receiving essentially 100% of write bandwidth (curve 270 in FIG. 2E). But, the host also expects at most a 10% performance drop when garbage collection is handling BDR and wear leveling bands. In this case, garbage collection is only allowed to take up to 10% of the write bandwidth. This means that the host will consume ten bands of space while garbage collection re-writes one BDR/wear leveling band. Critically, the ten band performance consistency cushion is only required for low WA workloads (e.g., about 1) since garbage collection can only take up to a maximum of 10% bandwidth. When WA is high, garbage collection is allowed enough bandwidth to exactly match host free space consumption (curve 274 in FIG. 2E) while maintaining performance consistency.

In addition, during workload transitions, free space can fall significantly until garbage collection adapts its resources to the incoming workload. Additional bands (Corner to Critical in FIG. 2E) are needed to serve as reserve space for host consumption until garbage collection can catch-up. Without the additional bands as cushion, other critical system services would starve of free space and the system would fail. The amount of reserve space consumed depends on how quickly resources are adapted to the new workload. If resources are adapted quickly, then some bands between Corner and Critical can be released as effective spare.

To this end, in some embodiments, each time a band is processed by garbage collection logic (e.g., logic 224 of FIG. 2C), the number of reserved bands required to maintain performance consistency and SSD functionality is recalculated based on the MAV. Since only low WA workloads require the ten band performance consistency cushion (Normal to Corner in FIG. 2E), the cushion is reduced as soon as MAV starts to increase. Inversely, the cushion is increased as the MAV starts to decrease. In addition, the mechanism to expedite garbage collection's resource allocation during workload transitions (e.g., logic 160) also allows for the reduction of the ten band cushion (Corner to Critical in FIG. 2E) used for SSD functionality.

Figure 2F:
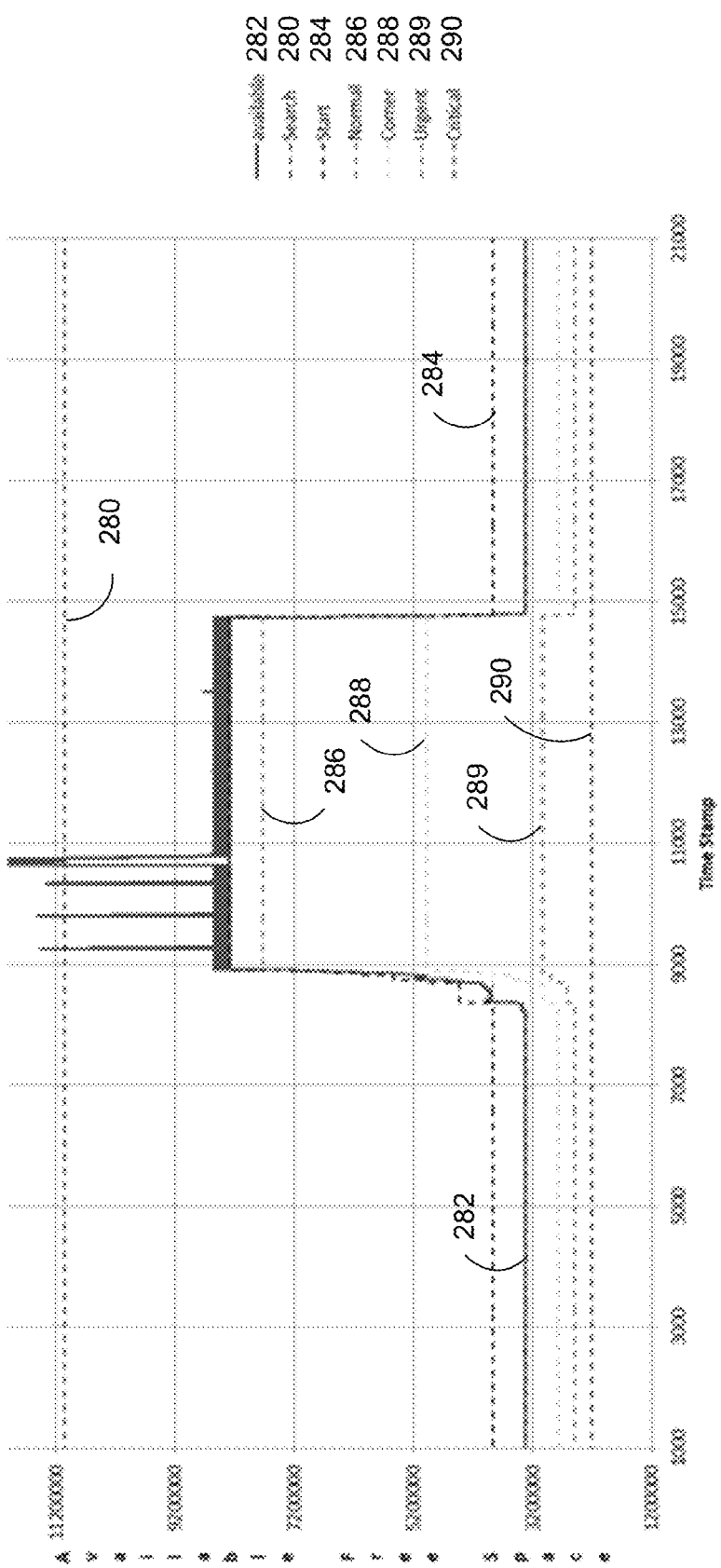

FIG. 2F illustrates a graph of available free space versus time, according to an embodiment. More particularly, FIG. 2F shows how the number of reserved band transitions along with workload's WA. As shown in FIG. 2F, during time stamps 1000-8500 and 14800-21000: Running high WA (e.g., great than 2) workload (4K random writes) and Normal to Corner=Corner to Critical=2 bands reserved. Also, during time stamp 8501-14799: running low WA (about 1) workload (128K sequential writes) and Normal to Corner=Corner to Critical=10 bands reserved.

Figure 3:
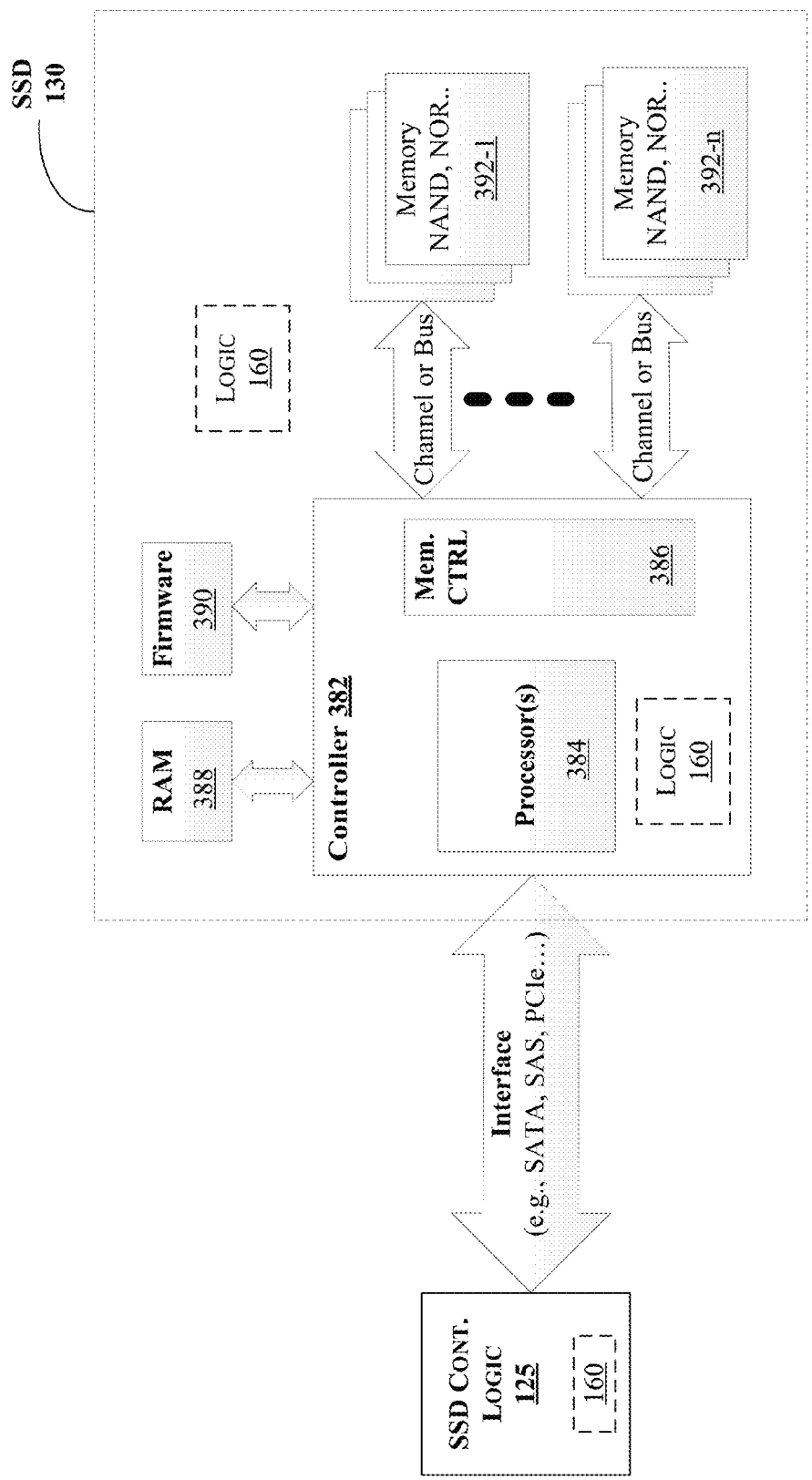
FIG. 3 illustrates a block diagram of various components of a solid state drive, according to an embodiment.

FIG. 3 illustrates a block diagram of various components of an SSD, according to an embodiment. Logic 160 may be located in various locations such as inside the SSD or SSD controller logic, e.g., such as illustrated in FIG. 3. SSD 130 includes a controller logic 382 (which in turn includes one or more processor cores or processors 384 and memory controller logic 386), Random Access Memory (RAM) 388, firmware storage 390, and one or more memory modules or dies 392-1 to 392-n (which may include NAND flash, NOR flash, or other types of non-volatile memory, such as the those discussed with reference to FIGS. 2A-2F). Memory modules 392-1 to 392-n are coupled to the memory controller logic 386 via one or more memory channels or busses. Also, SSD 130 communicates with logic 125 via an interface (such as a SATA, SAS, PCIe (Peripheral Component Interconnect express), etc. interface). One or more of the operations discussed with reference to FIGS. 1-6 may be performed by one or more of the components of FIG. 3, e.g., processors 384 and/or controller 382 may compress/decompress (or otherwise cause compression/decompression) of data written to or read from memory modules 392-1 to 392-n. Also, one or more of the operations of FIGS. 1-6 may be programmed into the firmware 390. Further, controller 382 may include logic 160.

Accordingly, some embodiments provide one or more of the following implementations:

(1) By detecting the workload running on the SSD, garbage collection can release unneeded reserved bands as effective spare while still maintaining performance consistency;
  a. Each time a band is processed by garbage collection, the number of reserved bands required to maintain performance consistency and SSD functionality is recalculated based on the MAV.
  b. Since only low WA workloads require the ten band performance consistency cushion (Normal to Corner in FIG. 2E), the cushion is reduced (as a consequence—effective spare, performance and endurance is increased and WA is reduced) as soon as MAV starts to increase. Inversely, the cushion is increased (back to its original values) as the MAV starts to decrease; and/or (2) In addition, by quickly adapting its resource allocation during workload transitions, garbage collection can release additional reserved bands as effective spare while maintaining SSD functionality;
  a. Candidate bands for garbage collection are organized in queues. By using the validity of the bands in the queues to calculate the moving average validity, garbage collection has a better representation of the resources needed for the incoming workload and can adapt its resource allocation faster;
  b. Since MAV quickly responded to the change in workload, Available did not significantly drop and some additional number of bands (those bands which were previously used to prevent the system from starving of free space and failing) of reserve space can now be returned as effective spare to the SSD, maximizing effect of (1) above.

Figure 4:
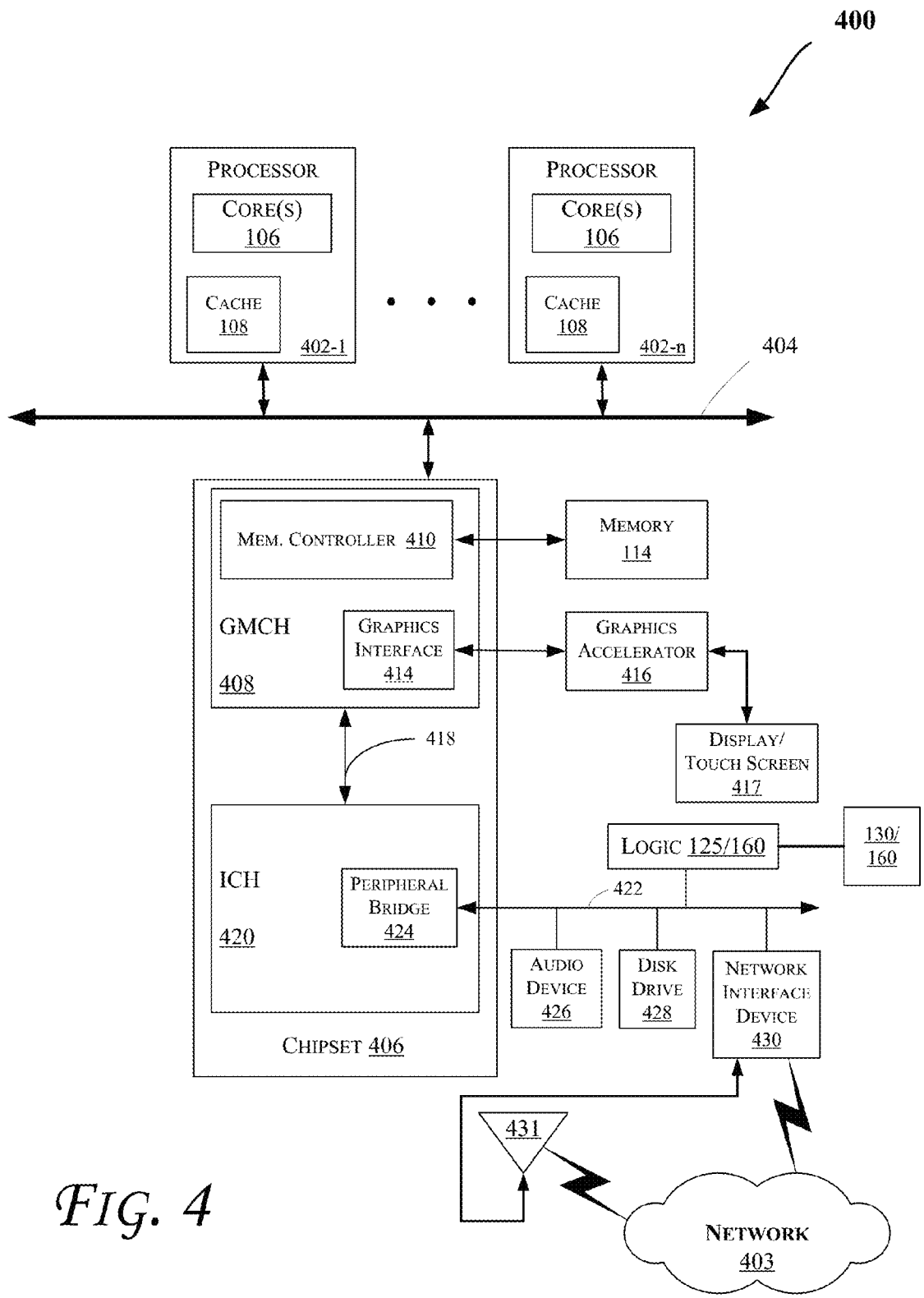

FIG. 4 illustrates a block diagram of a computing system 400 in accordance with an embodiment. The computing system 400 may include one or more central processing unit(s) (CPUs) 402 or processors that communicate via an interconnection network (or bus) 404. The processors 402 may include a general purpose processor, a network processor (that processes data communicated over a computer network 403), an application processor (such as those used in cell phones, smart phones, etc.), or other types of a processor (including a reduced instruction set computer (RISC) processor or a complex instruction set computer (CISC)). Various types of computer networks 403 may be utilized including wired (e.g., Ethernet, Gigabit, Fiber, etc.) or wireless networks (such as cellular, 3G (Third-Generation Cell-Phone Technology or 3rd Generation Wireless Format (UWCC)), 4G, Low Power Embedded (LPE), etc.). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors.

In an embodiment, one or more of the processors 402 may be the same or similar to the processors 102 of FIG. 1. For example, one or more of the processors 402 may include one or more of the cores 106 and/or cache 108. Also, the operations discussed with reference to FIGS. 1-3 may be performed by one or more components of the system 400.

A chipset 406 may also communicate with the interconnection network 404. The chipset 406 may include a graphics and memory control hub (GMCH) 408. The GMCH 408 may include a memory controller 410 (which may be the same or similar to the memory controller 120 of FIG. 1 in an embodiment) that communicates with the memory 114. The memory 114 may store data, including sequences of instructions that are executed by the CPU 402, or any other device included in the computing system 400. Also, system 400 includes logic 125, SSD 130, and/or logic 160 (which may be coupled to system 400 via bus 422 as illustrated, via other interconnects such as 404, where logic 125 is incorporated into chipset 406, etc. in various embodiments). In one embodiment, the memory 114 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk drive, flash, etc., including any NVM discussed herein. Additional devices may communicate via the interconnection network 404, such as multiple CPUs and/or multiple system memories.

The GMCH 408 may also include a graphics interface 414 that communicates with a graphics accelerator 416. In one embodiment, the graphics interface 414 may communicate with the graphics accelerator 416 via an accelerated graphics port (AGP) or Peripheral Component Interconnect (PCI) (or PCI express (PCIe) interface). In an embodiment, a display 417 (such as a flat panel display, touch screen, etc.) may communicate with the graphics interface 414 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display 417.

A hub interface 418 may allow the GMCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403, e.g., via a wired or wireless interface). As shown, the network interface device 430 may be coupled to an antenna 431 to wirelessly (e.g., via an Institute of Electrical and Electronics Engineers (IEEE) 802.11 interface (including IEEE 802.11a/b/g/n/ac, etc.), cellular interface, 3G, 4G, LPE, etc.) communicate with the network 403. Other devices may communicate via the bus 422. Also, various components (such as the network interface device 430) may communicate with the GMCH 408 in some embodiments. In addition, the processor 402 and the GMCH 408 may be combined to form a single chip. Furthermore, the graphics accelerator 416 may be included within the GMCH 408 in other embodiments.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
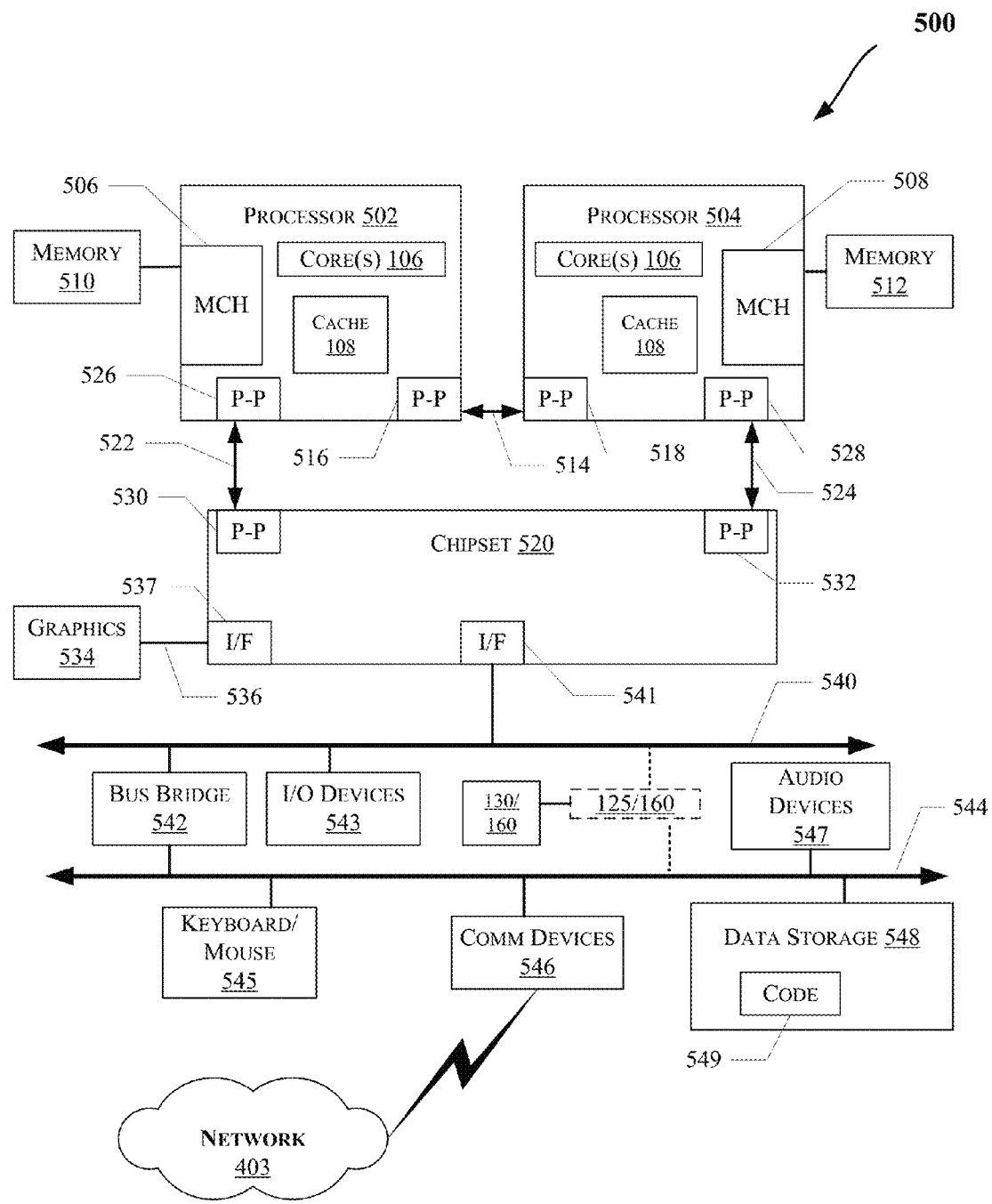

FIG. 5 illustrates a computing system 500 that is arranged in a point-to-point (PtP) configuration, according to an embodiment. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 114 of FIGS. 1 and/or 4. Also, MCH 506 and 508 may include the memory controller 120 in some embodiments. Furthermore, system 500 includes logic 125, SSD 130, and/or logic 160 (which may be coupled to system 500 via bus 540/544 such as illustrated, via other point-to-point connections to the processor(s) 502/504 or chipset 520, where logic 125 is incorporated into chipset 520, etc. in various embodiments).

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537. As discussed with reference to FIG. 4, the graphics interface 536 may be coupled to a display device (e.g., display 417) in some embodiments.

As shown in FIG. 5, one or more of the cores 106 and/or cache 108 of FIG. 1 may be located within the processors 502 and 504. Other embodiments, however, may exist in other circuits, logic units, or devices within the system 500 of FIG. 5. Furthermore, other embodiments may be distributed throughout several circuits, logic units, or devices illustrated in FIG. 5.

The chipset 520 may communicate with a bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403, as discussed with reference to network interface device 430 for example, including via antenna 431), audio I/O device, and/or a data storage device 548. The data storage device 548 may store code 549 that may be executed by the processors 502 and/or 504.

Figure 6:
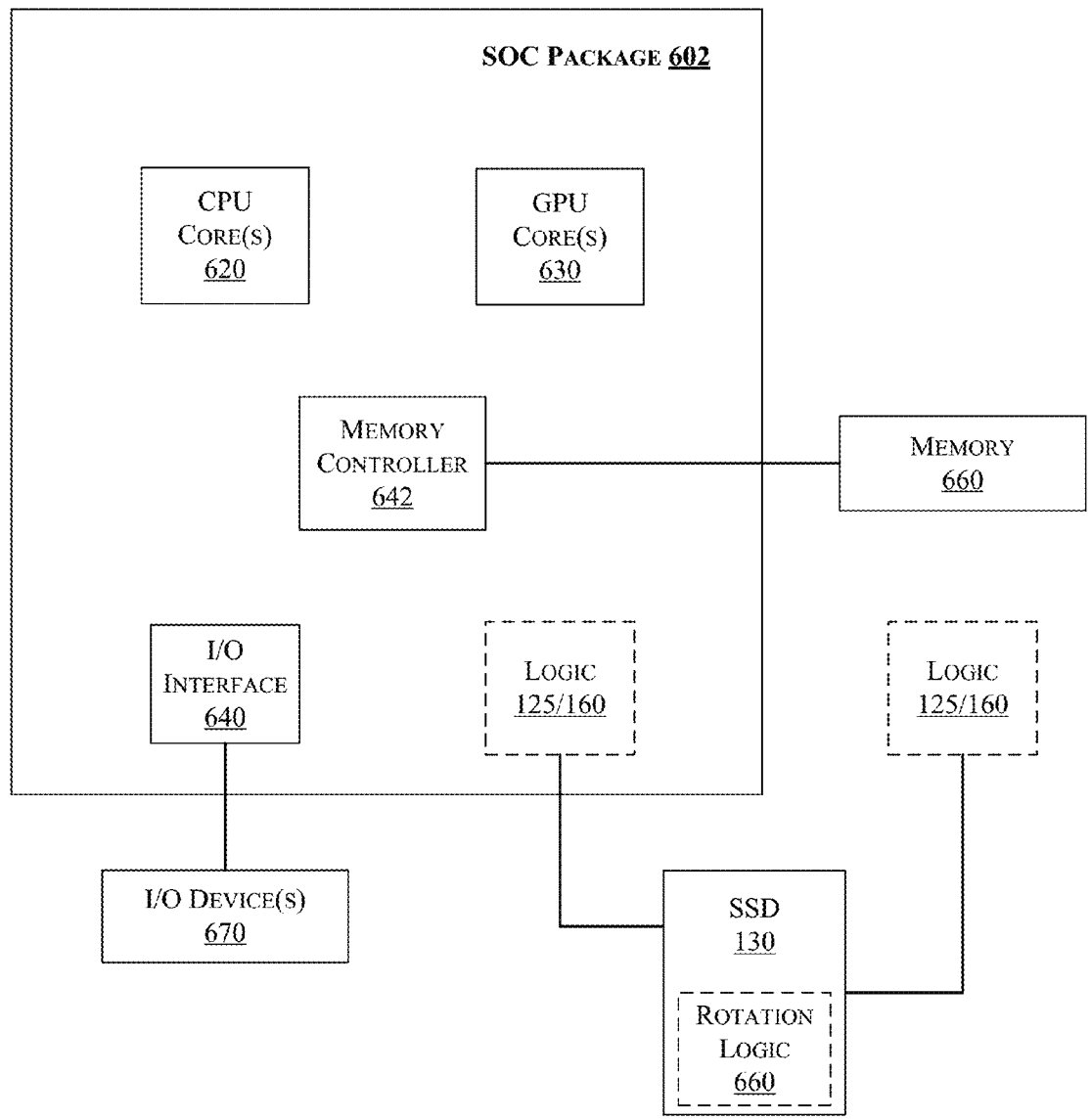

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged onto a single semiconductor device.

As illustrated in FIG. 6, SOC package 602 is coupled to a memory 660 (which may be similar to or the same as memory discussed herein with reference to the other figures) via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like. Furthermore, SOC package 602 may include/integrate the logic 125 in an embodiment. Alternatively, the logic 125 may be provided outside of the SOC package 602 (i.e., as a discrete logic).

The following examples pertain to further embodiments. Example 1 includes 1 includes an apparatus comprising: non-volatile memory to store data corresponding to a first workload and a second workload; and logic to determine allocation of one or more resources in the non-volatile memory based at least in part on a determination of an average validity of one or more candidate bands to be processed during operation of the first workload or the second workload. Example 2 includes the apparatus of example 1, wherein the logic is to determine the allocation of the one or more resources to garbage collection logic and a host coupled to the non-volatile memory. Example 3 includes the apparatus of example 2, wherein the garbage collection logic is to free space occupied by invalid data in the non-volatile memory. Example 4 includes the apparatus of example 2, wherein the logic to determine the allocation of the one or more resources is to comprise the garbage collection logic. Example 5 includes the apparatus of example 1, wherein logic to determine the allocation of the one or more resources in the non-volatile memory based at least in part on the determination of an average validity of the one or more candidate bands to be processed during a transition from the first workload to the second workload. Example 6 includes the apparatus of example 1, wherein the logic is to determine the allocation of the one or more resources to cause an increase in an effective spare space of the non-volatile memory. Example 7 includes the apparatus of example 1, wherein the logic is to determine the allocation of the one or more resources to cause a reduction of write amplification in the non-volatile memory. Example 8 includes the apparatus of example 1, wherein the second workload is to immediately follow the first workload. Example 9 includes the apparatus of example 1, wherein the first workload is an empty or idle workload. Example 10 includes the apparatus of example 1, wherein the non-volatile memory and the logic are on a same integrated circuit device. Example 11 includes the apparatus of example 1, wherein the non-volatile memory is to comprise one of: nanowire memory, Ferro-electric transistor random access memory (FeTRAM), magnetoresistive random access memory (MRAM), flash memory, Spin Torque Transfer Random Access Memory (STTRAM), Resistive Random Access Memory, Phase Change Memory (PCM), and byte addressable 3-Dimensional Cross Point Memory. Example 12 includes the apparatus of example 1, wherein an SSD is to comprise the non-volatile memory and the logic.

Example 13 includes a method comprising: storing data corresponding to a first workload and a second workload in a non-volatile memory; and determining allocation of one or more resources in the non-volatile memory based at least in part on a determination of an average validity of one or more candidate bands processed during operation of the first workload or the second workload. Example 14 includes the method of example 13, further comprising determining the allocation of the one or more resources to garbage collection logic and a host coupled to the non-volatile memory. Example 15 includes the method of example 13, further comprising the garbage collection logic freeing space occupied by invalid data in the non-volatile memory. Example 16 includes the method of example 13, wherein determining the allocation of the one or more resources in the non-volatile memory causes an increase in an effective spare space of the non-volatile memory. Example 17 includes the method of example 13, wherein determining the allocation of the one or more resources in the non-volatile memory causes a reduction of write amplification in the non-volatile memory. Example 18 includes the method of example 13, wherein the first workload is an empty or idle workload. Example 19 includes the method of example 13, wherein the non-volatile memory comprises one of: nanowire memory, Ferro-electric transistor random access memory (FeTRAM), magnetoresistive random access memory (MRAM), flash memory, Spin Torque Transfer Random Access Memory (STTRAM), Resistive Random Access Memory, Phase Change Memory (PCM), and byte addressable 3-Dimensional Cross Point Memory. Example 20 includes the method of example 13, further comprising determining the allocation of the one or more resources in the non-volatile memory based at least in part on the determination of an average validity of the one or more candidate bands processed during a transition from the first workload to the second workload.

Example 21 includes a system comprising: non-volatile memory; and at least one processor core to access the non-volatile memory; the non-volatile memory to store data corresponding to a first workload and a second workload; and logic to determine allocation of one or more resources in the non-volatile memory based at least in part on a determination of an average validity of one or more candidate bands to be processed during operation of the first workload or the second workload. Example 22 includes the system of example 21, wherein the logic is to determine the allocation of the one or more resources to garbage collection logic and a host coupled to the non-volatile memory. Example 23 includes the system of example 21, wherein the logic is to determine the allocation of the one or more resources to cause an increase in an effective spare space of the non-volatile memory. Example 24 includes the system of example 21, wherein the logic is to determine the allocation of the one or more resources to cause a reduction of write amplification in the non-volatile memory. Example 25 includes the system of example 21, wherein the first workload is an empty or idle workload.

Example 26 includes a computer-readable medium comprising one or more instructions that when executed on a processor configure the processor to perform one or more operations to: store data corresponding to a first workload and a second workload in a non-volatile memory; and determine allocation of one or more resources in the non-volatile memory based at least in part on a determination of an average validity of one or more candidate bands processed during operation of the first workload or the second workload. Example 27 includes the computer-readable medium of example 26, further comprising one or more instructions that when executed on the processor configure the processor to perform one or more operations to cause determining the allocation of the one or more resources to garbage collection logic and a host coupled to the non-volatile memory. Example 28 includes the computer-readable medium of example 26, further comprising one or more instructions that when executed on the processor configure the processor to perform one or more operations to cause the garbage collection logic freeing space occupied by invalid data in the non-volatile memory. Example 29 includes the computer-readable medium of example 26, further comprising one or more instructions that when executed on the processor configure the processor to perform one or more operations to determine the allocation of the one or more resources in the non-volatile memory to cause an increase in an effective spare space of the non-volatile memory. Example 30 includes the computer-readable medium of example 26, further comprising one or more instructions that when executed on the processor configure the processor to perform one or more operations to determine the allocation of the one or more resources in the non-volatile memory to cause a reduction of write amplification in the non-volatile memory. Example 31 includes the computer-readable medium of example 26, wherein the first workload is an empty or idle workload. Example 32 includes the computer-readable medium of example 26, wherein the non-volatile memory comprises one of: nanowire memory, Ferro-electric transistor random access memory (FeTRAM), magnetoresistive random access memory (MRAM), flash memory, Spin Torque Transfer Random Access Memory (STTRAM), Resistive Random Access Memory, Phase Change Memory (PCM), and byte addressable 3-Dimensional Cross Point Memory. Example 33 includes the computer-readable medium of example 26, further comprising one or more instructions that when executed on the processor configure the processor to perform one or more operations to determine the allocation of the one or more resources in the non-volatile memory based at least in part on the determination of an average validity of the one or more candidate bands processed during a transition from the first workload to the second workload.

Example 34 includes an apparatus comprising means to perform a method as set forth in any preceding example.

Example 35 comprises machine-readable storage including machine-readable instructions, when executed, to implement a method or realize an apparatus as set forth in any preceding example.

In various embodiments, the operations discussed herein, e.g., with reference to FIGS. 1-6, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-6.

Additionally, such tangible computer-readable media may be downloaded as a computer program product, wherein the program may be transferred from a remote computer (e.g., a server) to a requesting computer (e.g., a client) by way of data signals (such as in a carrier wave or other propagation medium) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   non-volatile memory to store data corresponding to a first workload and a second workload; and
   logic to determine allocation of one or more resources in the non-volatile memory based at least in part on a determination of an average validity of one or more blocks to be processed during a transition from the first workload to the second workload.

2. The apparatus of claim 1, wherein the logic is to determine the allocation of the one or more resources to garbage collection logic and a host coupled to the non-volatile memory.

3. The apparatus of claim 2, wherein the garbage collection logic is to free space occupied by invalid data in the non-volatile memory.

4. The apparatus of claim 2, wherein the logic to determine the allocation of the one or more resources is to comprise the garbage collection logic.

5. The apparatus of claim 1, wherein logic to determine the allocation of the one or more resources in the non-volatile memory based at least in part on the determination of the average validity of the one or more blocks to be processed during operation of the first workload or the second workload.

6. The apparatus of claim 1, wherein the logic is to determine the allocation of the one or more resources to cause an increase in an effective spare space of the non-volatile memory.

7. The apparatus of claim 1, wherein the logic is to determine the allocation of the one or more resources to cause a reduction of write amplification in the non-volatile memory.

8. The apparatus of claim 1, wherein the second workload is to immediately follow the first workload.

9. The apparatus of claim 1, wherein the first workload is an empty or idle workload.

10. The apparatus of claim 1, wherein the non-volatile memory and the logic are on a same integrated circuit device.

11. The apparatus of claim 1, wherein the non-volatile memory is to comprise one of: nanowire memory, Ferro-electric transistor random access memory (FeTRAM), magnetoresistive random access memory (MRAM), flash memory, Spin Torque Transfer Random Access Memory (STTRAM), Resistive Random Access Memory, Phase Change Memory (PCM), and byte addressable 3-Dimensional Cross Point Memory.

12. The apparatus of claim 1, wherein an SSD is to comprise the non-volatile memory and the logic.

13. A method comprising:
storing data corresponding to a first workload and a second workload in a non-volatile memory; and
determining allocation of one or more resources in the non-volatile memory based at least in part on a determination of an average validity of one or more blocks processed during a transition from the first workload to the second workload.

14. The method of claim 13, further comprising determining the allocation of the one or more resources to garbage collection logic and a host coupled to the non-volatile memory.

15. The method of claim 13, further comprising the garbage collection logic freeing space occupied by invalid data in the non-volatile memory.

16. The method of claim 13, wherein determining the allocation of the one or more resources in the non-volatile memory causes an increase in an effective spare space of the non-volatile memory.

17. The method of claim 13, wherein determining the allocation of the one or more resources in the non-volatile memory causes a reduction of write amplification in the non-volatile memory.

18. The method of claim 13, wherein the first workload is an empty or idle workload.

19. The method of claim 13, wherein the non-volatile memory comprises one of: nanowire memory, Ferro-electric transistor random access memory (FeTRAM), magnetoresistive random access memory (MRAM), flash memory, Spin Torque Transfer Random Access Memory (STTRAM), Resistive Random Access Memory, Phase Change Memory (PCM), and byte addressable 3-Dimensional Cross Point Memory.

20. The method of claim 13, further comprising determining the allocation of the one or more resources in the non-volatile memory based at least in part on the determination of the average validity of the one or more blocks processed during operation of the first workload or the second workload.

21. A system comprising:
non-volatile memory; and
at least one processor core to access the non-volatile memory;
the non-volatile memory to store data corresponding to a first workload and a second workload; and
logic to determine allocation of one or more resources in the non-volatile memory based at least in part on a determination of an average validity of one or more blocks to be processed during a transition from the first workload to the second workload.

22. The system of claim 21, wherein the logic is to determine the allocation of the one or more resources to garbage collection logic and a host coupled to the non-volatile memory.

23. The system of claim 21, wherein the logic is to determine the allocation of the one or more resources to cause an increase in an effective spare space of the non-volatile memory.

24. The system of claim 21, wherein the logic is to determine the allocation of the one or more resources to cause a reduction of write amplification in the non-volatile memory.

25. The system of claim 21, wherein the first workload is an empty or idle workload.

26. The system of claim 21, wherein logic to determine the allocation of the one or more resources in the non-volatile memory based at least in part on the determination of the average validity of the one or more blocks to be processed during operation of the first workload or the second workload.

* * * * *